United States Patent [19]

Khattar

[11] Patent Number: 4,971,139
[45] Date of Patent: Nov. 20, 1990

[54] HEAT TUBE DEVICE

[75] Inventor: Mukesh K. Khattar, San Jose, Calif.

[73] Assignee: The United States of America as represented by the Administrator of the National Aeronautics and Space Administration, Washington, D.C.

[21] Appl. No.: 473,065

[22] Filed: Jan. 31, 1990

[51] Int. Cl.$^5$ ................ F28D 15/02; F28F 27/00
[52] U.S. Cl. ..................... 165/86; 165/96; 165/104.14; 62/90; 62/333; 62/384
[58] Field of Search ............ 165/96, 86, 104.14; 62/90, 333, 384

[56] References Cited

U.S. PATENT DOCUMENTS

| | | | |
|---|---|---|---|
| 2,072,486 | 3/1937 | Smith | 62/90 |
| 3,788,388 | 1/1974 | Barkmann | 165/104.14 |
| 4,064,932 | 12/1977 | Iriarte | 165/86 |

Primary Examiner—Albert W. Davis, Jr.
Attorney, Agent, or Firm—James O. Harrell; John R. Manning

[57] ABSTRACT

The present invention discloses a heat tube device through which a working fluid can be circulated to transfer heat to air in a conventional air conditioning system. The heat tube device is disposable about a conventional cooling coil of the air conditioning system and includes a plurality of substantially U-shaped tubes connected to a support structure. The support structure includes members for allowing the heat tube device to be readily positioned about the cooling coil. An actuatable adjustment device is connected to the U-shaped tubes for allowing, upon actuation thereof, for the heat tubes to be simultaneously rotated relative to the cooling coil for allowing the heat transfer from the heat tube device to air in the air conditioning system to be selectively varied.

19 Claims, 2 Drawing Sheets

HEAT TUBE DEVICE

ORIGIN OF THE INVENTION

The invention described herein was made in the performance of work done under a NASA contract and is subject to the provisions of Section 305 of the National Aeronautics and Space Act of 1958, Public Law 85-568 (72 Stat. 435; 42 USC §2457).

BACKGROUND OF THE INVENTION

The present invention relates generally to a heat tube device which is readily positionable about the cooling coil or coils of a conventional air conditioning system.

Conventional heat pipes are used for transporting heat from a heat source to a heat sink, with the heat sink being of a lower temperature than the heat source. Typically, one end of the heat pipe is exposed to the heat source while the other end of the heat pipe is exposed to the heat sink. The end of the heat pipe exposed to the heat source is normally known as the evaporator section of the heat pipe, while the end of the heat pipe exposed to the heat sink is normally known as the condenser section of the heat pipe. Heat is absorbed by a working fluid in the evaporator section which is in a liquid phase. Upon the absorption of heat by the evaporator section, the working fluid changes from its liquid phase to a vapor phase. The heat load picked up by the evaporator section is thereupon thermodynamically driven to the condenser section of the heat tube because of the temperature differential which exists between the heat source and the heat sink.

Upon the working fluid in its vapor phase reaching the condenser section of the heat tube, the heat load is rejected from the working fluid to the heat sink. This energy loss from the working fluid causes the working fluid to condense to a liquid phase in the condenser section of the heat pipe. Because the heat pipe may be a sealed system, the working fluid in its liquid phase may then return to the evaporator section of the heat pipe, typically by means of a capillary pumping structure located inside the heat pipe. Generally, the capillary pumping structure is an elongated wick carried in the heat pipe for substantially the entire length thereof.

Various types of capillary pumping structures are disclosed in U.S. Pat. No. 4,470,450, granted on Sept. 11, 1984 to Bizzell et al., entitled, "Pump-Assisted Heat Pipe", which include grooved inner wall surfaces being provided in the heat pipe.

A heat pipe finds particular use in a conventional air conditioning system. There, the evaporator section of the heat pipe is exposed to the warmer return air entering the air conditioning system prior to the return air passing over the air conditioner's cooling coils. Thus, the warmer return air acts as the heat source discussed above for causing the working fluid in a liquid phase in the evaporator section of the heat pipe to vaporize as the working fluid absorbs heat from the return air.

The condenser section of the heat pipe is positioned in the cold supply air flow of the air conditioning system on the other side of the cooling coils. Thus, the cold air coming from the cooling coils, to which the condenser section of the heat pipe is exposed, acts as the heat sink discussed above to which the heat load absorbed by the working fluid is transferred from the working fluid in its vapor phase. The transfer of the heat load from the working fluid in its vapor phase causes the working fluid to condense to liquid in the condenser section of the heat tube. The liquid may then be transferred by gravity or by some pumping means back to the evaporator section of the heat tube.

By using the heat tube with a conventional air conditioning system, the amount of moisture which can be removed from the return air can be increased without increasing the amount of cooling required from cooling coils. This is particularly advantageous in humid environments where the return air must first be cooled to a very low temperature for removing the required amount of moisture therefrom, and then reheated with electric heaters, steam heaters, etc., to make the supply air a temperature which is comfortable or which is required by the particular environment. This method of dehumidifying the air requires the use of a relatively large amount of energy, in that additional energy is required for the cooling coil to cool the air down for removing the moisture therefrom, and then further additional energy is required for heating the supply air back up to the desired temperature.

The heat tube allows for air to be pre-cooled by passing over the evaporator section of the heat tube so that the cooling coil does not have to cool the air quite as much, thereby allowing a reduced energy requirement. Moreover, as the cold air exits from the cooling coil, it is warmed by the condenser section of the heat tube, thereby eliminating the need for additional externally powered heat to be provided the exit air flow in certain applications. Because the heat tube is a sealed system which may operate without any moving parts, the heat pipe may require no additional energy input to the air conditioning system.

Various systems have been patented which utilize heat pipes. U.S. Pat. No. 4,607,498, granted to Dinh, entitled, "High Efficiency Air-Conditioner/Dehumidifier", discloses a heat pipe-type heat exchanger positionable about a coil of an air conditioning system.

U.S. Pat. Nos. 2,093,725 and 2,214,057, both granted to Hull, and entitled, "Refrigerating Apparatus", disclose secondary refrigerant systems positionable about an evaporator coil of a refrigeration system. The secondary refrigerator systems of the Hull patents disclose several means by which the performance of the secondary refrigerant system can be modified.

Other patented devices for air handling systems include the following U.S. Pat. Nos.: 2,438,120, granted to Freygang; 3,520,147, granted to Glackman; 3,640,090, granted to Ares; 3,916,644, granted to Nasser; 4,033,406 and 4,147,206, both granted to Basiulis; 4,044,797, granted to Fujie et al.; 4,061,186, granted to Ljung; 4,071,080, granted to Bridgers; and 4,438,636, granted to Morgan.

While several of the above-patented devices disclose the use of heat pipes, none is particularly adapted, as is the present invention, for being readily positioned about a cooling coil of a conventional air conditioning system. Further, none disclose such a heat pipe device which is readily adjustable in a manner as disclosed by the present invention for varying the heat transfer therefrom.

SUMMARY OF THE INVENTION

The present invention recognizes and addresses such drawbacks of the prior art. Thus, it is a general object of the present invention to provide a heat tube device which is readily positionable about a cooling coil of a conventional air conditioning system.

It is another object of the present invention to provide a heat tube device which is readily adjustable for varying the performance thereof.

It is another object of the present invention to provide a heat tube device which can be used in a wide variety of applications.

Still another object of the present invention is to provide a heat tube device which can be positioned about a conventional cooling coil such that air entering the cooling coil may pass over the heat tube device and through the cooling coil in a relatively straight path.

Yet another object of the present invention is to provide a heat tube device which is of relatively simple construction.

Various combinations of the features which are presently disclosed may be provided in a given embodiment thereof in accordance with this invention. Generally, one such exemplary embodiment of the present invention includes a heat tube device through which a fluid can be circulated to transfer heat to air in a conventional air conditioning system, the heat tube device being positionable about a conventional cooling coil of the air conditioning system, the cooling coil having an intake side and an exhaust side. The heat tube device comprises a support structure and at least one substantially U-shaped tube connected to the support structure. The U-shaped tube has a longitudinally extending evaporator section, a longitudinally extending condenser section, and a transversely extending linking section connected therebetween. Each of the evaporator, condenser, and liquid sections defines a fluid flow passage therein. The evaporator section and the condenser section each have a first end and a second end, the first end of each of the evaporator and condenser sections being in fluid communication with the linking section. The fluid flow passages of the evaporator and condenser sections are in fluid communication with one another through the fluid flow passage of the linking section. The second end of each of the evaporator and condenser sections is sealed. Means are provided for inserting the heat tube device about the cooling coil such that the evaporator section of the U-shaped tube is adjacent the intake side of the cooling coil, and the condenser section of the U-shaped tube is adjacent the exhaust side of the cooling coil. Also provided are actuatable adjustment means connected to the U-shaped tube for allowing upon actuation thereof the evaporator and condenser sections to be simultaneously rotated relative to the cooling coil for allowing the heat transfer from the heat tube device to the air in the air conditioning system to be selectively varied.

More specifically, the heat tube device of the present invention includes a plurality of U-shaped tubes positioned one above the other and connected to the support structure. Linking means are connected between the U-shaped tubes and the actuatable adjustment means for allowing the evaporator and condenser sections of the U-shaped tubes to be selectively rotated relative to the cooling coil.

BRIEF DESCRIPTION OF THE DRAWINGS

The foregoing as well as other objects of the present invention will be more apparent from the following detailed description of a preferred embodiment thereof, including the best mode thereof, when taken together with the accompanying drawings, in which.

DESCRIPTION OF THE PREFERRED EMBODIMENT

Figure 1:
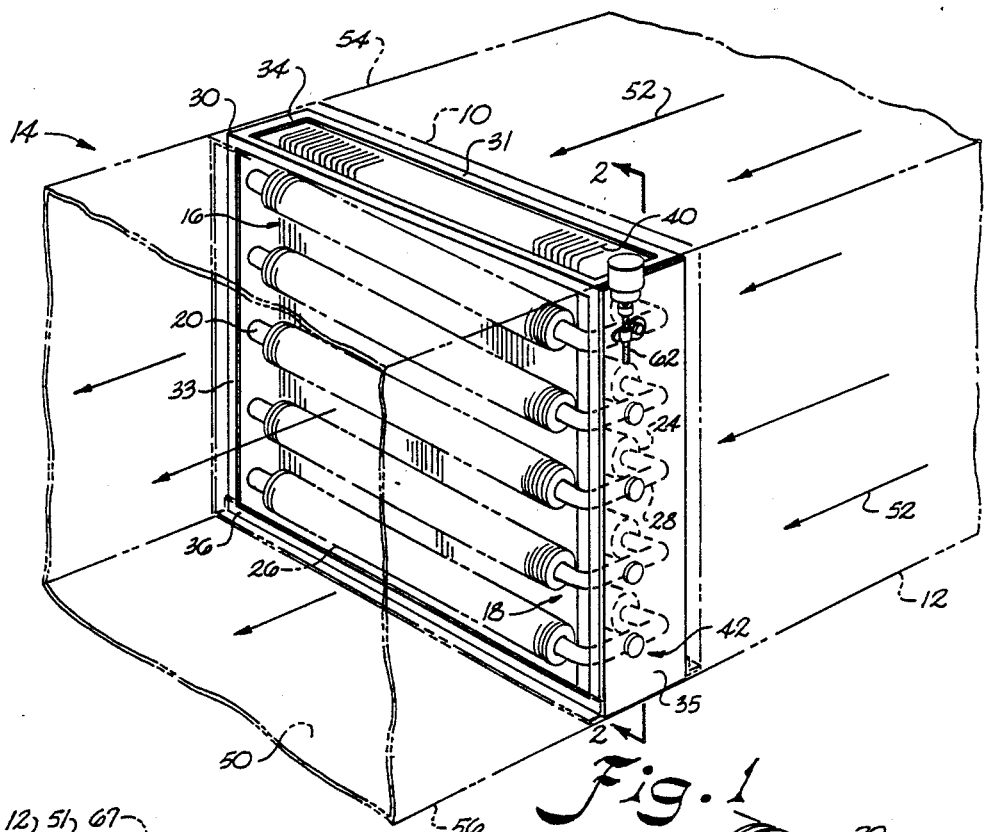
FIG. 1 is a perspective view of a heat tube device constructed in accordance with the present invention and positioned about a conventional cooling coil of a conventional air conditioning system.

Referring to the drawings in detail, wherein like reference characters represent like elements and/or features throughout the various views, the heat tube device or structure of the present invention is indicated generally in FIG. 1 by reference numeral 10. Heat tube structure 10 is illustrated in a duct 12 of a conventional air conditioning system, generally 14, only a portion of which is shown. Heat tube structure 10 is positioned about a conventional evaporator or cooling coil, generally 16, which is part of air conditioning system 14.

Heat tube structure 10 includes at least one, but preferably a plurality of, substantially U-shaped tubes, generally 18. U-shaped tubes 18 are hollow and are sealed at the ends 20, 22 thereof. Each U-shaped tube 18 includes an evaporator section 24 and a condenser section 26. A linking section 28 connects evaporator and condenser sections 24 and 26 together.

Figure 8:
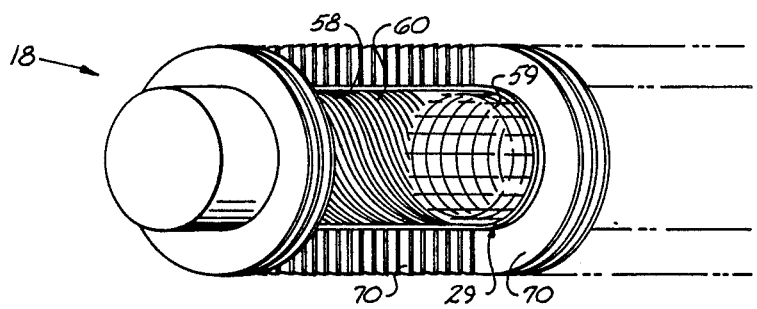
FIG. 8 is a perspective view, with parts cut away, of the interior of a heat tube constructed in accordance with the present invention.

U-shaped tubes 18 are hollow, with evaporator, condenser, and linking sections 24, 26, and 28 together defining a continuous fluid flow passage, generally 29, as shown in FIG. 8, which extends the length of each U-shaped tube 18. Thus, flow passage 29 allows for evaporator, condenser, and linking sections 24, 26, and 28 to all be in fluid communication with one another.

Heat tube structure 10 preferably includes the plurality of U-shaped tubes 18 being positioned one above the other and connected to a support structure, generally 30. Support structure 30 is illustrated as extending substantially vertically adjacent an end 40 of cooling coil 16. Support structure 30 includes a box-like interconnected frame having upper members 31, side members 33, corner members 34, an end plate 35, and base support members 36. Support structure 30 could be constructed of a metal such as steel, aluminum, or an alloy, etc., or of any other suitable material fastened together in any suitable manner. U-shaped tubes 18 may be pivotally attached to end plate 35 of support structure 30 by means of pivotal connectors, generally 42, thereby allowing U-shaped tubes 18 to be rotated relative to end plate 35 and cooling coil 16 in a manner described in more detail hereinafter.

Support structure 30 has extending from lower portions thereof elongated base support members or rails 36 which allow for heat tube structure 10 to be supported about cooling coil 16 such that evaporator sections 24 are adjacent an intake side 46 of cooling coil 16, and condenser sections 24 are adjacent an exhaust side 48 of cooling coil 16. Because the end of support structure 30 is open opposite end plate 35, support structure 30 can be easily positioned about cooling coil 16 on base support members 36 which allow for heat tube structure 10 to be readily inserted in duct 12 about cooling coil 16. Base support members 36 slidingly engaging cooling coil 16 and/or lower surfaces 50 of duct 12 for supporting heat tube structure 10 thereon. Base support guide members 51 which extend across duct 12 may be provided in duct 12 for aiding in retaining heat tube structure 10 about cooling coil 16 through contact with base support members 36.

By supporting evaporator sections 24 on intake side 46 of cooling coil 16, evaporator sections 24 are subjected to the warmer return air, which enters duct 12 in a direction as indicated by arrows 52. This warmer return air is air which has typically been circulated through the area serviced by air conditioning system 14, the air picking up heat in such area as it circulates therethrough. Also, fresh air could also be introduced into the intake section 54 of duct 12. Such air is conventionally forced through duct 12 by means such as a fan or blower (not shown). The warmer air to which evaporator sections 24 are exposed acts as a heat source, as discussed above, for providing heat to evaporator sections 24.

A two-phase working fluid (not shown) is provided in the U-shaped tubes 18 and could be any of a variety of conventional fluids such as Freon 11 or Freon 12 (registered trademarks), ethanol, methanol, water, or any other suitable fluid. U-shaped pipes 18 could be metal, such as steel, aluminum, an alloy, etc., or could be made of any other suitable material.

In operation, the working fluid is generally in a liquid phase when in evaporator sections 24. However, upon evaporator sections 24 being exposed to the heat source of the warmed air in the intake section 54 of duct 12, the working fluid will tend to vaporize and move to condenser sections 26 of U-shaped tubes 18 on the opposite side of cooling coil 16, in other words, on the exhaust side 48 of cooling coil 16 in the exhaust or supply air section 56 of duct 12. While the air is passing through cooling coil 16, the air becomes cooled and then passes over condenser sections 26 of U-shaped tubes 18. The cold air passing over condenser sections 26 acts as a heat sink for absorbing heat energy from the working fluid which was vaporized in evaporator sections 24. The heat energy in the vaporized working fluid is thus absorbed by the cold supply air, which in turn causes the working fluid to condense back into a liquid. Transfer of the heat to the cold supply air correspondingly warms the supply air prior to the supply air being delivered to the area serviced by air conditioning system 14. Because each U-shaped tube 18 is a closed system, the liquified working fluid stays in U-shaped tubes 18 and moves back to evaporator sections 24 to start the vaporizing-condensing cycle once again. The phase change phenomena of the working fluid which occurs in evaporator sections 24 and condenser sections 26 allows for a highly efficient transfer of heat from the return air to U-shaped tubes 18 and from U-shaped tubes 18 to the cold supply air.

Figure 2:
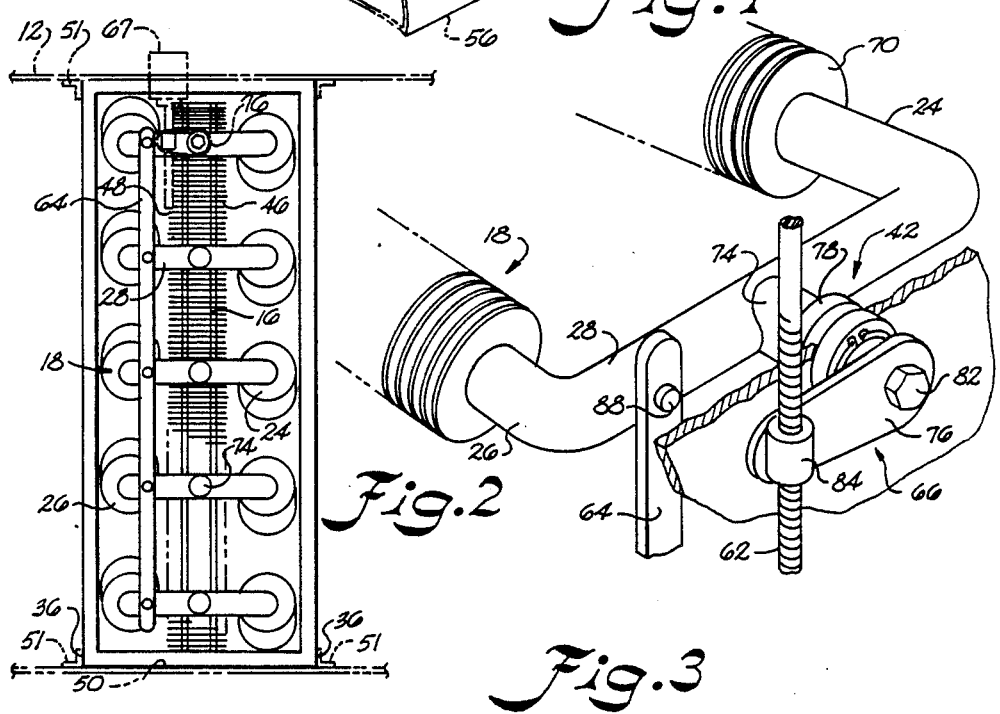
FIG. 2 is a sectional view taken along lines 2—2 of FIG. 1.
Figure 3:
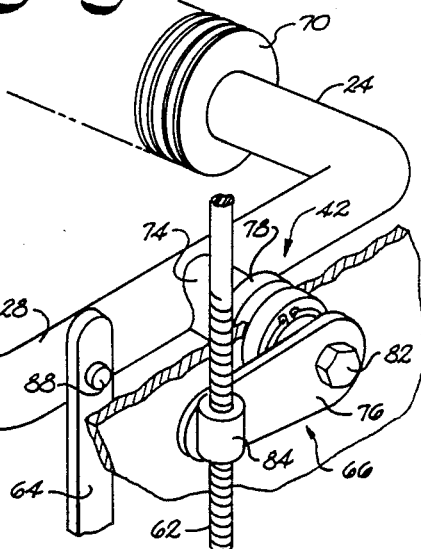
FIG. 3 is a perspective view, with parts cut away, of adjustment means constructed in accordance with the present invention for rotating a U-shaped heat tube of the present invention.

Transfer of the working fluid from the condenser sections 26 back down to evaporator sections 24 is accomplished primarily by gravity. As can be seen in FIGS. 1 and 2, linking sections 28 are disposed generally horizontally relative to the end 40 of cooling coil 16. Condenser sections 26 are inclined upwardly with respect to linking sections 28, and evaporator sections 24 are inclined downwardly with respect to linking sections 28. Thus, gravity plays an important role in the transfer of the working fluid, once it has condensed back into a liquid, down from condenser sections 26 to evaporator sections 24. However, to obtain optimum heat transfer from U-shaped tubes 18 to the air in air conditioning system 14, it is desirable that the liquid working fluid be dispersed evenly about the interior walls of U-shaped tubes 18. In order to facilitate this, the interior walls of U-shaped tubes 18 may be provided with grooves such as rifling, cross-hatched patterns, longitudinally extending grooves, etc. A preferred embodiment for the interior of heat tubes 18 is illustrated in FIG. 8, which includes circumferentially extending screens 59 provided adjacent the inner wall surfaces 58 of U-shaped tubes 18 along with rifled inner wall surfaces 58, which include closely spaced spiral grooves 60. U.S. Pat. No. 4,470,450, granted to Bizzell et al., entitled, "Pump-Assisted Heat Pipe", discussed above, discloses various internal wall configurations for heat pipes.

The internal wall surface configurations along with the circumferentially extending screens 59 provide for a capillary pumping or "thermosiphoning" action which allows for the condensed working fluid to be transferred from the condenser sections 26 of the U-shaped heat tubes 18. While the U-shaped tubes 18 of the present invention will operate with inner wall surfaces 58 being smooth and without the circumferentially extending screens 59, spiral grooves 60 and circumferentially extending screens 59 enhance the performance of heat tube structure 10 by evening out the distribution of the working fluid on inner wall surfaces 58. Such allows for improved heat transfer between the air in air conditioning system 14 and the working fluid contained in sealed U-shaped tubes 18.

The performance of heat pipe structure 10 depends upon, among other things, the air velocity across its surface, return and supply air temperatures, the flow capacity through U-shaped tubes 18, the angle of evaporator sections 24 and condenser sections 26 relative to one another, etc. Means for simultaneously adjusting the angle of evaporator and condenser sections 24, 26 is discussed below.

Heat tube structure 10 is illustrated in FIG. 1 as having a plurality of U-shaped tubes 18 pivotally connected to vertical end plate 35 by pivotal connectors 42. Linkage means includes an elongated threaded linkage member 62 which is connected to linking sections 28 by a pivotal connector, generally 66. Thus, upon rotation of one U-shaped tube 18 about a pivotal connector 42, relative to support structure 30 and cooling coil 16, the remaining U-shaped tubes 18 would likewise be rotated about cooling coil through the action of a linking member 64. Each of U-shaped tubes 18 include a boss 74 fixedly attached to the linking section 28 thereof. A circumferential bearing surface 78 is provided bosses 74 for allowing rotation thereof in bores of end plate 35. Pivotal connector 66 includes a plate 76 which is fixedly connected to a boss 74 attached to uppermost linking section 28 by a bolt 82. Plate 76 is connected to threaded member 62 by a connector 84, such that upon rotation of threaded member 62, plate 76 pivots uppermost U-shaped tube 18. The remaining U-shaped tubes 18 are connected to the uppermost U-shaped tube 18 by an elongated linkage member 64. Member 64 is pivotally connected to all of the U-shaped tubes 18 by pivotal connector shafts 88 attached to the linking sections 26 of U-shaped tubes 18. Thus, upon pivoting of any one of the U-shaped tubes 18, the other U-shaped tubes 18 will pivot accordingly.

Means for actuatably adjusting U-shaped tubes 18 for rotation relative to vertical support member 38, and accordingly, cooling coil 16 could involve a manually-operated knob (not shown) or a motor 67, as shown in FIGS. 1 and 2, for allowing U-shaped tubes 18 to be simultaneously rotated relative to cooling coil 16 for allowing the heat transfer from heat tube structure 10 to be selectively varied. By varying the angle of U-shaped tubes 18 with respect to cooling coil 16, the performance of heat tube structure 10 is accordingly changed. For example, if U-shaped tubes 18 are rotated such that evaporator sections 24 are at a significantly higher elevation than are condenser sections 26, the operation of heat tube device 10 will cease because all of the liquified working fluid will flow down to condenser sections 26. Because condenser sections 26 are not exposed to a heat source, but are instead exposed to cold supply air, the working fluid will not readily vaporize, thereby preventing operation of heat tube device 10.

Thus, where the air flowing through air conditioning system 14 is moist and needs to be dehumidified, U-shaped tubes 18 would be rotated relative to support member 35 such that air passing over the evaporator sections 24 would be pre-cooled as much as possible. If for some reason this caused an undesirable amount of heat to be added to the air flowing from cooling coil 16 across condenser sections 26 of heat tube structure 10, then U-shaped tubes 18 would be rotated relative to vertical support member 35 such that some proper balance is reached between the cooling of the incoming air by evaporator sections 24 and the warming of the exiting supply air by condenser sections 26. Temperature and humidity sensors (not shown) could be connected to motor 67 for automatically activating motor 67 to rotate U-shaped tubes 18 for automatically achieving the desired performance of heat tube device 10.

Figure 4:
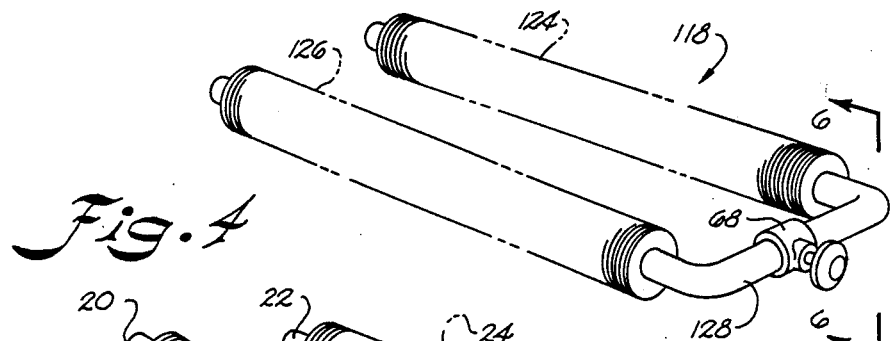
FIG. 4 is a perspective view of an alternate embodiment of a heat tube constructed in accordance with the present invention.
Figure 5:
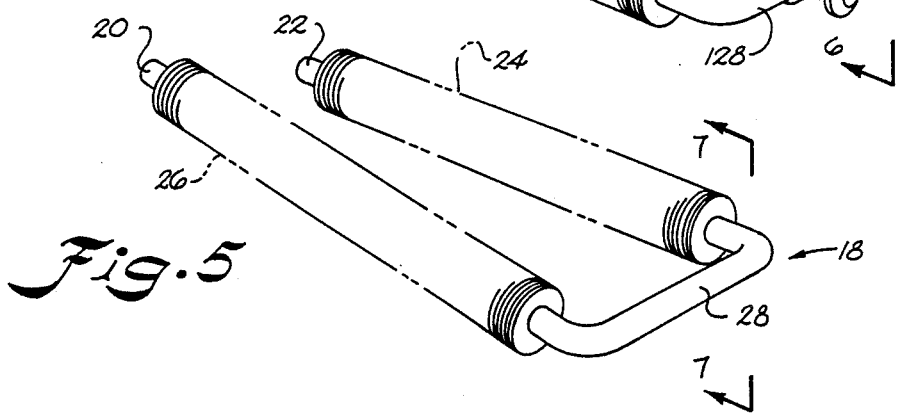
FIG. 5 is a perspective view of a heat tube constructed in accordance with the present invention.
Figure 7:
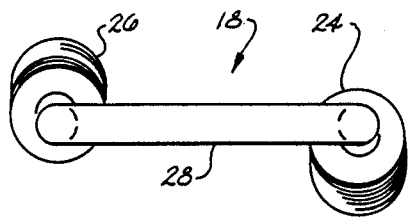
FIG. 7 is a sectional view taken along lines 7—7 of FIG. 5.
Figure 6:
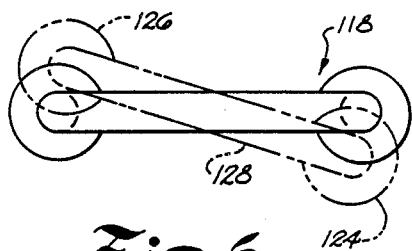
FIG. 6 is a sectional view taken along lines 6—6 of FIG. 4.

As shown in FIGS. 5 and 7, a single heat tube is indicated, as discussed above, wherein the evaporator section 24 extends downwardly from linking section 28, and condenser section 26 extends upwardly from linking section 28. However, as shown in FIGS. 4 and 6, an alternate embodiment of a U-shaped tube is indicated generally be reference numeral 118. U-shaped tube 118 includes an evaporator section 124 and a condenser section 126 which extend substantially parallel to one another. Evaporator section 124 is, however, movable to a lower elevation than condenser section 126, as illustrated in phantom in FIG. 6, through rotation of linking section 128 about pivotal member (not shown) such as bosses 74 in end plate 35. In such a position, linking section 128 would extend at an angle upwardly from evaporator section 124 to condenser section 126. U-shaped tube 118 is sealed likewise as is U-shaped tube 18, and operates substantially identically to U-shaped tube 18, with a working fluid provided therein vaporizing in evaporator section 124, passing as a vapor to condenser section 126 through linking section 128, condensing back into a liquid in condenser section 126, and returning back to the evaporator section 124 as a liquid through linking section 128.

As illustrated in FIG. 4, a simple control valve 68 can be provided in linking section 128 of a U-shaped tube 118, or as not shown, in linking section 28 of U-shaped tube 18, to control the flow capacity of flow passage 29 and accordingly the rate at which the working fluid therein is transferred back and forth between evaporator section 24, 124 and condenser section 26, 126. Control valve 68 can be actuated manually or automatically, although only a manually-operated version is illustrated. The automatic operation of control valve 68 could be determined by a humidity/temperature sensor (not shown) connected to control valve 68 for constantly adjusting control valve 68 responsive to air conditions. Control valve 68 could also be a proportional valve for restricting the flow of the working fluid through linking section 28, 128.

While heat tube structure 10 has been illustrated for use with a substantially vertical cooling coil 16, it is to be understood that heat pipe structure 10 can be used on a cooling coil 16 disposed at any angle, including one where cooling coil 16 is disposed horizontally. In such a horizontal position, heat tube structure 10 would simply be placed around horizontal cooling coil 16 in the same manner in which it is placed around cooling coil 16 when cooling coil 16 is vertical. However, additional support members (not shown) may need to be provided for heat tube structure 10 for supporting it in the horizontal position.

An important feature of the present invention is that heat tube structure 10 can be readily positioned about a cooling coil of a conventional, existing air conditioning structure. Then, once heat tube structure has been inserted about a cooling coil, the performance of heat tube structure 10 can be readily varied through the rotation of U-shaped tubes 18 relative to the cooling coil by manual and/or power driven means discussed above. Further, control valves 68 could be provided in linking sections 28 of U-shaped tubes 18 for also varying the performance of heat tube structure 10. Heat tube structure 10 could also be readily removed from a cooling coil if necessary without interfering with the performance of the air conditioning system. Handles 72 are provided on end plate 35 of heat tube structure 10 for facilitating its insertion in and removal from heat duct 12.

Although cooling coil 16 is indicated as a vertical panel-type structure, it is to be understood that heat tube structure 10 of the present invention could be used with cooling coils of a variety of shapes and sizes and is not limited to use with the vertical cooling coil illustrated.

U-shaped tubes 18 could also be provided with heat exchanger fins 70 for projecting outwardly therefrom along the evaporator and condenser sections 24, 26. Such fins 70 may improve the heat transfer between the air in the air conditioning system and the evaporator and condenser sections 24, 26, thereby enhancing the performance of heat tube structure 10.

From the foregoing, it can be seen that the above objects have been met by heat tube structure 10 constructed in accordance with the present invention. Such a heat tube structure is relatively simple in construction, finds use in a wide variety of applications, and may be readily adjusted to vary the performance thereof.

While one preferred embodiment of the invention has been described using specific terms, such description is for present illustrative purposes only, and it is to be understood that changes and variations to such embodiment, including but not limited to the substitution of equivalent features or parts, and the reversal of various features thereof, may be practiced by those of ordinary skill in the art without departing from the spirit or scope of the following claims.

What is claimed is:

1. A heat tube device through which a fluid can be circulated to transfer heat to air in a conventional air conditioning system, the heat tube device being positionable about a conventional cooling coil of the air conditioning system, the cooling coil having an intake side and an exhaust side, the heat tube device comprising:
   a support structure;
   at least one substantially U-shaped tube connected to said support structure, said U-shaped tube having a longitudinally extending evaporator section, a longitudinally extending condenser section, and a transversely extending linking section connected therebetween; each of said evaporator, condenser, and linking sections defining a fluid flow passage therein; each of said evaporator condenser sections having a first end and a second end, said first end of each of said evaporator and condenser sections being in fluid communication with said linking section, said fluid flow passages of said evaporator and condenser sections being in fluid communication with one another through said fluid flow passage of said linking section; said second end of each of said evaporator and condenser sections being sealed;
   means for inserting the heat tube device about the cooling coil such that said evaporator section of said U-shaped tube is adjacent the intake side of the cooling coil, and said condenser section of said U-shaped tube is adjacent the exhaust side of the cooling coil; and
   actuatable adjustment means connected to said U-shaped tube for allowing upon actuation thereof said evaporator and condenser sections to be simultaneously related relative to the cooling coil for allowing the heat transfer from the heat tube device to the air in the air conditioning system to be selectively varied.

2. A heat tube device as set forth in claim 1, wherein said evaporator, condenser, and linking sections are angled with respect to one another.

3. A heat tube device as set forth in claim 1, wherein said at least one U-shaped tube includes a plurality of U-shaped tubes, positioned one above the other, connected to said support structure.

4. A heat tube device as set forth in claim 3, further comprising:
   linking means connected between said plurality of U-shaped tubes and said adjustment means for allowing said evaporation and condenser sections of each of said plurality of U-shaped tubes to be selectively rotated relative to the cooling coil.

5. A heat tube device as set forth in claim 4, wherein said linkage means includes elongated at least one linkage member pivotally connected to said plurality of U-shaped tubes, wherein said U-shaped tubes are pivotally connected to said support structure, and wherein upon movement of said linking member, said U-shaped tubes rotate relative to the cooling coil and to said support structure.

6. A heat tube device as set forth in claim 4, wherein said adjustment means includes a motor connected to said linking means for selectively rotating said U-shaped tubes relative to the cooling coil.

7. A heat tube device as set forth in claim 1, further comprising a control valve provided in said at least one U-shaped tube for selectively varying the flow capacity of said fluid flow passages in said U-shaped tube.

8. A heat tube device as set forth in claim 1, further comprising said evaporator, condenser, and linking sections each having interior wall portions which define grooves for transferring the fluid between said evaporator, condenser, and linking sections.

9. A heat tube as set forth in claim 8, further comprising said evaporator, condenser, and linking sections each including substantially circumferentially extending screen portions spaced inwardly from each of said interior wall positions thereof, said screen portions being adapted for carrying fluid thereon between said evaporator, condenser, and linking sections.

10. A heat tube device as set forth in claim 1, wherein said means for inserting the heat tube device about the cooling coil includes sliding members connected to said support structure for allowing the heat tube device to slide into place about the cooling coil.

11. A heat tube device as set forth in claim 1, wherein said adjustment means includes a motor for selectively rotating said evaporator and condenser sections relative to the cooling coil.

12. A heat tube device as set forth in claim 1, wherein said linking section is disposed generally horizontally about the cooling coil, wherein said evaporator section is inclined downwardly with respect to said linking section, and wherein said condenser section is inclined upwardly with respect to said linking section.

13. A heat tube device as set forth in claim 1, wherein said evaporator and said condenser sections extend substantially parallel with respect to one another, wherein said condenser section is movable to a higher elevation relative to said evaporator section, and wherein said linking section extends upwardly from said evaporator section to said condenser section when said condenser section is moved to said elevation higher than said evaporator section.

14. A heat tube device through which fluid can be circulated to transfer heat to air in a conventional air conditioning system, the heat tube device being positionable about a conventional cooling coil of the air conditioning system, the cooling coil having an intake side, an exhaust side, and an end between said intake and exhaust sides, the heat tube device comprising:
   a support structure for extending adjacent the end of the cooling coil;
   a plurality of substantially U-shaped tubes connected to said support structure, said U-shaped tubes being positionable about the cooling coil, the U-shaped tubes each having a longitudinally extending evaporator section, a longitudinally extending condenser section, and a transversely extending linking section connected therebetween; each of said evaporator, condenser, and linking sections defining a fluid flow passage therein; each of said evaporator and condenser sections having a first end and a second end, said first end of each of said evaporator and condenser sections being in fluid communication with said linking section, said fluid flow passages of each of said evaporator and condenser sections being in fluid communication with one another through said fluid flow passage of said linking section; said second end of each of said evaporator and condenser sections being sealed;

an insertion structure connected to said support structure for inserting the heat tube device about the cooling coil such that said evaporator sections of said U-shaped tubes are adjacent the intake side of the cooling coil, and said condenser sections of said U-shaped tubes are adjacent the exhaust side of the cooling coil;

linking means connected between said U-shaped tubes for allowing said evaporator and condenser sections of each of said plurality of U-shaped tubes to be selectively rotated relative to the cooling coil; and actuatable adjustment means connected to said linking means for allowing upon actuation thereof said evaporator and condenser sections of said U-shaped tubes to be simultaneously rotated relative to the cooling coil for allowing the heat transfer from the heat tube device to the air in the air conditioning system to be selectively varied.

15. A heat tube device as set forth in claim 14, further comprising said evaporator, condenser, and linking sections of said U-shaped tubes having an interior wall portion which defines grooves for transferring the fluid between said evaporator, condenser, and linking sections.

16. A heat tube device as set forth in claim 14, wherein said adjustment means includes at least one motor connected to said linking means for selectively rotating said U-shaped tubes relative to the cooling coil.

17. A heat tube device as set forth in claim 14, further comprising said evaporator and condenser sections of said U-shaped tubes having a plurality of heat exchanger fins projecting outwardly therefrom.

18. A heat tube device as set forth in claim 14, wherein said linking means includes a rotatable longitudinally extending threaded member associated with at least one of said U-shaped tubes such that upon rotation of said threaded member, said U-shaped tubes are rotated relative to the cooling coil.

19. A heat tube device as set forth in claim 14, wherein said U-shaped tubes are pivotally connected to said support structure for being rotated relative to the cooling coil.

* * * * *